United States Patent
Zhang et al.

(10) Patent No.: US 10,193,707 B2
(45) Date of Patent: Jan. 29, 2019

(54) PACKET TRANSMISSION METHOD AND APPARATUS

(71) Applicant: Huawei Technologies Co., Ltd., Shenzhen (CN)

(72) Inventors: Mingui Zhang, Beijing (CN); Jianfei He, Shenzhen (CN); Guoyi Chen, Beijing (CN); Jie Dong, Beijing (CN); Fuyou Miao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 15/494,334

(22) Filed: Apr. 21, 2017

(65) Prior Publication Data
US 2017/0230197 A1   Aug. 10, 2017

Related U.S. Application Data

(63) Continuation of application No. PCT/CN2015/088892, filed on Sep. 2, 2015.

(30) Foreign Application Priority Data
Oct. 22, 2014   (CN) .......................... 2014 1 0568124

(51) Int. Cl.
*H04L 12/46*   (2006.01)
*H04L 12/753*   (2013.01)
(Continued)

(52) U.S. Cl.
CPC ...... *H04L 12/4633* (2013.01); *H04L 12/4641* (2013.01); *H04L 45/24* (2013.01);
(Continued)

(58) Field of Classification Search
None
See application file for complete search history.

(56) References Cited

U.S. PATENT DOCUMENTS

| 2012/0131216 A1 | 5/2012 | Jain et al. |
| 2012/0201124 A1 | 8/2012 | Marques et al. |

(Continued)

FOREIGN PATENT DOCUMENTS

| CN | 103684956 A | 3/2014 |
| CN | 103916317 A | 7/2014 |
| CN | 104104534 A | 10/2014 |

OTHER PUBLICATIONS

Kreeger et al., "Network Virtualization NVE to NVA Control Protocol Requirements draft-ietf-nvo3-nve-nva-cp-req-02". Internet-Draft, Intended Status: Informational, pp. 1-12, Internet Engineering Task Force, Reston, Virginia (Apr. 24, 2014).

(Continued)

*Primary Examiner* — Eunsook Choi
(74) *Attorney, Agent, or Firm* — Leydig, Voit & Mayer, Ltd.

(57) ABSTRACT

An embodiment of a Network Virtualization Edge (NVE) device for transmitting packets receives a packet including a source address and a destination address. The NVE device obtains an active-active access configuration information list including a first entry and a second entry, where the first entry includes an identifier of a first active-active group, a Virtual Network Instance (VNI), and an identifier of the NVE device, and the second entry includes an identifier of a second active-active group, a VNI, and identifiers of at least two NVE devices that belong to the second active-active group. The NVE device obtains the VNI according to the identifier of the NVE device, searches for one active-active group corresponding to the VNI, selects a second NVE device from the at least two NVE devices; and encapsulates the packet using an identifier of the second NVE device and the VNI, and sends the packet.

18 Claims, 6 Drawing Sheets

(51) Int. Cl.
*H04L 12/741* (2013.01)
*H04L 12/715* (2013.01)
*H04L 12/707* (2013.01)
*H04L 29/12* (2006.01)

(52) U.S. Cl.
CPC .............. *H04L 45/48* (2013.01); *H04L 45/64* (2013.01); *H04L 45/74* (2013.01); *H04L 61/103* (2013.01); *H04L 2212/00* (2013.01)

(56) References Cited

U.S. PATENT DOCUMENTS

| | | | |
|---|---|---|---|
| 2013/0100851 | A1 | 4/2013 | Bacthu et al. |
| 2013/0148657 | A1 | 6/2013 | Salam et al. |
| 2014/0126422 | A1 | 5/2014 | Bragg |
| 2014/0233569 | A1* | 8/2014 | Yong ............ H04L 45/64 370/392 |
| 2014/0307744 | A1* | 10/2014 | Dunbar ........... H04L 45/44 370/401 |
| 2015/0063194 | A1* | 3/2015 | Yang ............ H04L 47/15 370/312 |
| 2016/0285736 | A1* | 9/2016 | Gu .............. H04L 12/2858 |

OTHER PUBLICATIONS

Bjorklund, "YANG-A Data Modeling Language for the Network Configuration Protocol (NETCONF)," Request for Comments: 6020, Category: Standards Track, pp. 1-173, Internet Engineering Task Force, Reston, Virginia (Oct. 2010).

Zhang et al., "YANG Data Model for Active-Active NVEs Configuration draft-zhang-nvo3-yang-active-active-cfg-03.txt", Internet-Draft, Intended Status: Standards Track, pp. 1-11, Internet Engineering Task Force, Reston, Virginia (Dec. 16, 2015).

Black et al., "An Architecture for Overlay Networks (NVO3) draft-ietf-nvo3-arch-01," Internet-Draft, Intended status: Informational, XP015097013, pp. 1-32, Internet Engineering Task Force, Reston, Virginia (Feb. 14, 2014).

Bitar et al., "NVO3 Data Plane Requirements draft-ietf-nvo3-dataplane-requirements-03.txt," Internet Draft, Intended Status: Informational, XP015098687, pp. 1-18, Internet Engineering Task Force, Reston, Virginia (Apr. 15, 2014).

"Draft Standard for Local and Metropolitan Area Networks—Link Aggregation," IEEE P802.1AX-REV™/D2.1, LAN MAN Standards Committee of the IEEE Computer Society, pp. 1-277, Institute of Electrical and Electronics Engineers, New York, New York (Jun. 25, 2013).

* cited by examiner

```
module: nvo3-aanve
   +--rw active-active-nve-groups* [end-id]
     +--rw end-id            END-DEVICE-ID
     +--rw multi-attached-info
       +--rw nve-list* [nve-id]
       | +--rw nve-id     NVE-ID
       | +--rw priority?  enumeration
       | +--rw vap-list*  if:interface-ref
       +--rw vni?                    VNI
       +--rw attached-ts-addresses*  TS-ADDRESS
```

FIG. 2

PACKET TRANSMISSION METHOD AND APPARATUS

CROSS-REFERENCE TO RELATED APPLICATIONS

This application is a continuation of International Application No. PCT/CN2015/088892, filed on Sep. 2, 2015, which claims priority to Chinese Patent Application No. 201410568124.X, filed on Oct. 22, 2014. The disclosures of the aforementioned applications are hereby incorporated by reference in their entireties.

TECHNICAL FIELD

The present disclosure relates to the field of communications technologies, and in particular, to a packet transmission method and apparatus.

BACKGROUND

An overlay network technology is a virtualization technology in which network overlay is performed based on an existing network architecture. For example, an overlay network may be overlaid on an Internet Protocol (IP) network to form Network Virtualization over Layer 3 (NVo3). Specifically, the overlay network may be a centralized network, such as a virtual extensible local area network (VXLAN) and Network Virtualization using Generic Routing Encapsulation (NVGRE).

A link aggregation technology may improve bandwidth and robustness of data transmission. The link aggregation technology aggregates two or more network connections into a logical link with higher bandwidth.

To further improve network performance, the overlay network technology and the link aggregation technology may be combined, and a problem accompanying this combination is how to properly transmit a packet in a network combining the two technologies.

SUMMARY

According to a packet transmission method and apparatus in embodiments of the present disclosure, a solution for implementing packet transmission in a network that combines an overlay network technology and a link aggregation technology is provided.

Therefore, the embodiments of the present disclosure provide the following technical solutions:

According to a first aspect, a packet transmission method is provided, where the method includes:

receiving, by a first Network Virtualization Edge (NVE) device, a first packet, where the first packet includes a first source address and a first destination address, the first source address is an address of a first virtual machine, and the first destination address is an address of a second virtual machine, where the first virtual machine is virtualized by a first physical server and the second virtual machine is virtualized by a second physical server;

obtaining, by the first NVE device, an active-active access configuration information list, where the active-active access configuration information list includes a first entry and a second entry, where the first entry includes an identifier of a first active-active group, a virtual network instance, and an identifier of the first NVE device, and the second entry includes an identifier of a second active-active group, the virtual network instance, and identifiers of at least two NVE devices that belong to the second active-active group;

obtaining, by the first NVE device, the virtual network instance according to the first entry and the identifier of the first NVE device;

searching, by the first NVE device, for at least one active-active group corresponding to the virtual network instance, where the at least one active-active group includes the second active-active group; and selecting a second NVE device from the at least two NVE devices belonging to the second active-active group; and encapsulating, by the first NVE device, the first packet by using an identifier of the second NVE device and the virtual network instance, and sending the encapsulated first packet to the second NVE device.

With reference to the first aspect, in a first possible implementation manner of the first aspect, the obtaining, by the first NVE device, an active-active access configuration information list includes: receiving, by the first NVE device, the active-active access configuration information list from a controller.

With reference to the first aspect or the first possible implementation manner of the first aspect, in a second possible implementation manner of the first aspect, the active-active access configuration information list is described in a Yet Another Next Generation (YANG) language, and the first entry carries the identifier of the first active-active group, the virtual network instance, and the identifier of the first NVE device by using a tree-like structure, where the identifier of the first active-active group is a root node, and the identifier of the first NVE device and the virtual network instance are subnodes.

With reference to any one of the first aspect, the first and the second possible implementation manners of the first aspect, in a third possible implementation manner of the first aspect, the active-active access configuration information list further includes a third entry, where the third entry includes an identifier of a third active-active group, the virtual network instance, and identifiers of at least two NVE devices that belong to the third active-active group; and the at least one active-active group includes the second active-active group and the third active-active group; and the sending the encapsulated first packet to the second NVE device includes:

determining, by the first NVE device, whether the second entry further includes the address of the second virtual machine; and if the second entry further includes the address of the second virtual machine, searching, by the first NVE device, for the second active-active group corresponding to the address of the second virtual machine, and sending the encapsulated first packet to the second NVE device.

With reference to the third possible implementation manner of the first aspect, in a fourth possible implementation manner of the first aspect, the method further includes: if the second entry does not include the address of the second virtual machine, the first NVE device sends the encapsulated first packet to the at least two NVE devices belonging to the second active-active group, and the at least two NVE devices belonging to the third active-active group.

With reference to any one of the first aspect, the first to the fourth possible implementation manners of the first aspect, in a fifth possible implementation manner of the first aspect, the first entry includes the identifier of the first active-active group, the virtual network instance, the identifier of the first NVE device, and the address of the first virtual machine, and the method further includes:

receiving, by the first NVE device, a second packet sent by a fourth NVE device, where the second packet includes the identifier of the first NVE device, the virtual network instance, a second source address, and a second destination address, where the second source address is an address of a third virtual machine, the second destination address is the address of the first virtual machine, and the third virtual machine is virtualized by a third physical server;

decapsulating, by the first NVE device, the second packet to obtain a decapsulated second packet, where the decapsulated second packet includes the second source address and the second destination address;

determining, by the first NVE device, whether the second destination address is the address of the first virtual machine in the first entry; and if the second destination address is the address of the first virtual machine in the first entry, sending, by the first NVE device, the decapsulated second packet according to the second destination address.

According to a second aspect, a packet transmission apparatus is provided, where the apparatus includes:

a first receiving unit, configured to receive a first packet, where the first packet includes a first source address and a first destination address, the first source address is an address of a first virtual machine, and the first destination address is an address of a second virtual machine, where the first virtual machine is virtualized by a first physical server and the second virtual machine is virtualized by a second physical server;

a first obtaining unit, configured to obtain an active-active access configuration information list after the first receiving unit receives the first packet, where the active-active access configuration information list includes a first entry and a second entry, where the first entry includes an identifier of a first active-active group, a virtual network instance, and an identifier of a first NVE device, and the second entry includes an identifier of a second active-active group, the virtual network instance, and identifiers of at least two NVE devices that belong to the second active-active group;

a second obtaining unit, configured to obtain, according to the first entry and the identifier of the first NVE device, the virtual network instance from the active-active access configuration information list obtained by the first obtaining unit;

a search unit, configured to search for at least one active-active group corresponding to the virtual network instance in the active-active access configuration information list obtained by the first obtaining unit, where the at least one active-active group includes the second active-active group; and select a second NVE device from the at least two NVE devices belonging to the second active-active group;

an encapsulation unit, configured to encapsulate the first packet by using an identifier of the second NVE device and the virtual network instance; and a first sending unit, configured to send the first packet encapsulated by the encapsulation unit to the second NVE device.

With reference to the second aspect, in a first possible implementation manner of the second aspect, the first obtaining unit is specifically configured to receive the active-active access configuration information list from a controller.

With reference to the second aspect or the first possible implementation manner of the second aspect, in a second possible implementation manner of the second aspect, the active-active access configuration information list obtained by the first obtaining unit is described in a Yet Another Next Generation (YANG) language, and the first entry carries the identifier of the first active-active group, the virtual network instance, and the identifier of the first NVE device by using a tree-like structure, where the identifier of the first active-active group is a root node, and the identifier of the first NVE device and the virtual network instance are subnodes.

With reference to any one of the second aspect, the first and the second possible implementation manners of the second aspect, in a third possible implementation manner of the second aspect, the active-active access configuration information list further includes a third entry, where the third entry includes an identifier of a third active-active group, the virtual network instance, and identifiers of at least two NVE devices that belong to the third active-active group; and the at least one active-active group includes the second active-active group and the third active-active group; and the first sending unit is specifically configured to determine whether the second entry further includes the address of the second virtual machine; and when the second entry further includes the address of the second virtual machine, search for the second active-active group corresponding to the address of the second virtual machine, and send the encapsulated first packet to the second NVE device.

With reference to the third possible implementation manner of the second aspect, in a fourth possible implementation manner of the second aspect, the first sending unit is further configured to: when the second entry does not include the address of the second virtual machine, send the encapsulated first packet to the at least two NVE devices belonging to the second active-active group, and the at least two NVE devices belonging to the third active-active group.

With reference to any one of the second aspect, the first to the fourth possible implementation manners of the second aspect, in a fifth possible implementation manner of the second aspect, the first entry includes the identifier of the first active-active group, the virtual network instance, the identifier of the first NVE device, and the address of the first virtual machine, and the apparatus further includes:

a second receiving unit, configured to receive a second packet sent by a fourth NVE device, where the second packet includes the identifier of the first NVE device, the virtual network instance, a second source address, and a second destination address, where the second source address is an address of a third virtual machine, the second destination address is the address of the first virtual machine, and the third virtual machine is virtualized by a third physical server;

a decapsulation unit, configured to decapsulate the second packet to obtain a decapsulated second packet, where the decapsulated second packet includes the second source address and the second destination address;

a determining unit, configured to determine whether the second destination address is the address of the first virtual machine in the first entry; and a second sending unit, configured to: when the determining unit determines that the second destination address is the address of the first virtual machine in the first entry, send the decapsulated second packet according to the second destination address.

According to a third aspect, a packet transmission device is provided, where the device includes: a processor and a memory; where the memory is configured to store a program instruction and data;

the processor is configured to read the program instruction and the data that are stored in the memory, so as to execute the following operations:

receiving, by the processor, a first packet, where the first packet includes a first source address and a first destination address, the first source address is an address of a first virtual machine, and the first destination address is an address of a second virtual machine, where the first virtual machine is virtualized by a first physical server and the second virtual machine is virtualized by a second physical server;

obtaining, by the processor, an active-active access configuration information list, where the active-active access configuration information list includes a first entry and a second entry, where the first entry includes an identifier of a first active-active group, a virtual network instance, and an identifier of a first NVE device, and the second entry includes an identifier of a second active-active group, the virtual network instance, and identifiers of at least two NVE devices that belong to the second active-active group;

obtaining, by the processor, the virtual network instance according to the first entry and the identifier of the first NVE device;

searching, by the processor, for at least one active-active group corresponding to the virtual network instance, where the at least one active-active group includes the second active-active group; and selecting a second NVE device from the at least two NVE devices belonging to the second active-active group; and encapsulating, by the first NVE device, the first packet by using an identifier of the second NVE device and the virtual network instance, and sending the encapsulated first packet to the second NVE device.

With reference to the third aspect, in a first possible implementation manner of the third aspect, the obtaining, by the processor, an active-active access configuration information list includes: receiving, by the first NVE device, the active-active access configuration information list from a controller.

With reference to the third aspect or the first possible implementation manner of the third aspect, in a second possible implementation manner of the third aspect, the active-active access configuration information list obtained by the processor is described in a Yet Another Next Generation (YANG) language, and the first entry carries the identifier of the first active-active group, the virtual network instance, and the identifier of the first NVE device by using a tree-like structure, where the identifier of the first active-active group is a root node, and the identifier of the first NVE device and the virtual network instance are subnodes.

With reference to any one of the third aspect, the first and the second possible implementation manners of the third aspect, in a third possible implementation manner of the third aspect, the active-active access configuration information list further includes a third entry, where the third entry includes an identifier of a third active-active group, the virtual network instance, and identifiers of at least two NVE devices that belong to the third active-active group; and the at least one active-active group includes the second active-active group and the third active-active group; and the sending, by the processor, the encapsulated first packet to the second NVE device includes:

determining, by the processor, whether the second entry further includes the address of the second virtual machine; and if the second entry further includes the address of the second virtual machine, searching, by the processor, for the second active-active group corresponding to the address of the second virtual machine, and sending the encapsulated first packet to the second NVE device.

With reference to the third possible implementation manner of the third aspect, in a fourth possible implementation manner of the third aspect, if the second entry does not include the address of the second virtual machine, the processor sends the encapsulated first packet to the at least two NVE devices belonging to the second active-active group, and the at least two NVE devices belonging to the third active-active group.

With reference to any one of the third aspect, the first to the third possible implementation manners of the third aspect, in a fourth possible implementation manner of the third aspect, the first entry includes the identifier of the first active-active group, the virtual network instance, the identifier of the first NVE device, and the address of the first virtual machine, and the processor further executes the following operations:

receiving, by the processor, a second packet sent by a fourth NVE device, where the second packet includes the identifier of the first NVE device, the virtual network instance, a second source address, and a second destination address, where the second source address is an address of a third virtual machine, the second destination address is the address of the first virtual machine, and the third virtual machine is virtualized by a third physical server;

decapsulating, by the processor, the second packet to obtain a decapsulated second packet, where the decapsulated second packet includes the second source address and the second destination address;

determining, by the processor, whether the second destination address is the address of the first virtual machine in the first entry; and if the second destination address is the address of the first virtual machine in the first entry, sending, by the processor, the decapsulated second packet according to the second destination address.

According to the packet transmission method and apparatus in the embodiments of the present disclosure, when active-active access configuration is performed, an active-active access configuration information list may be delivered to each NVE device in an NVo3 network, and when a first NVE device needs to send a packet, the first NVE device may obtain a VNI according to a stored active-active access configuration information list, and find a second NVE device according to the VNI, and further properly forwards the packet to the second NVE device after encapsulating the packet. Correspondingly, when the first NVE device needs to receive a packet, the first NVE device performs decapsulation processing on the received packet to restore a destination address included in the packet, and further forwards the packet to a VM corresponding to the destination address. After such a process, correct transmission of a packet is implemented.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings.

FIG. 2 is a schematic diagram of a tree-like structure of an active-active access configuration information list according to an embodiment of the present disclosure;

DESCRIPTION OF EMBODIMENTS

To enable a person skilled in the art to better understand the solutions in the present disclosure, the following describes embodiments of the present disclosure in more detail with reference to accompanying drawings and implementation manners.

Before the technical solutions in the embodiments of the present disclosure are described, specific application scenarios in the embodiments of the present disclosure are illustrated.

To resolve a conflict between a service requirement and a processing capability of a network, an overlay network may be established on the basis of a traditional network to improve the processing capability of the network. For example, an overlay network may be established on the basis of a traditional IP network to form an NVo3 network. In comparison with a processing capability of the traditional IP network, data packet transmission at an overlay network layer is added to the NVo3 network, that is, a data packet format supported by the network is added to improve the processing capability of the network. In addition, the NVo3 network further provides a large quantity of Network Virtualization Edge (NVE) devices that may be used by a tenant, that is, a quantity of access nodes of the network is increased to improve the processing capability of the network. Currently, the overlay network of the NVo3 may be presented as a centralized and virtualized network such as a VXLAN or an NVGRE established on the basis of the IP network. For example, an NVE device in the embodiments of the present disclosure may be a network entity that is located on a network edge and that may implement a layer 2 and/or layer 3 virtual network function. For details, refer to description in the Request for Comments (RFC) 7365, which is not described herein.

To further optimize the NVo3 network and improve data transmission performance of the NVo3 network, in a research and development process, the inventor finds that an active-active access technology may be used to implement active-active access of a virtual machine (VM) to an NVE device of the NVo3 network, so as to improve bandwidth and robustness of data transmission in the NVo3 network. For this purpose, the embodiments of the present disclosure are put forward. The following separately illustrates an active-active access configuration manner and a data transmission manner after completion of configuration that are involved in a process of active-active access to the NVo3 network.

Figure 1:
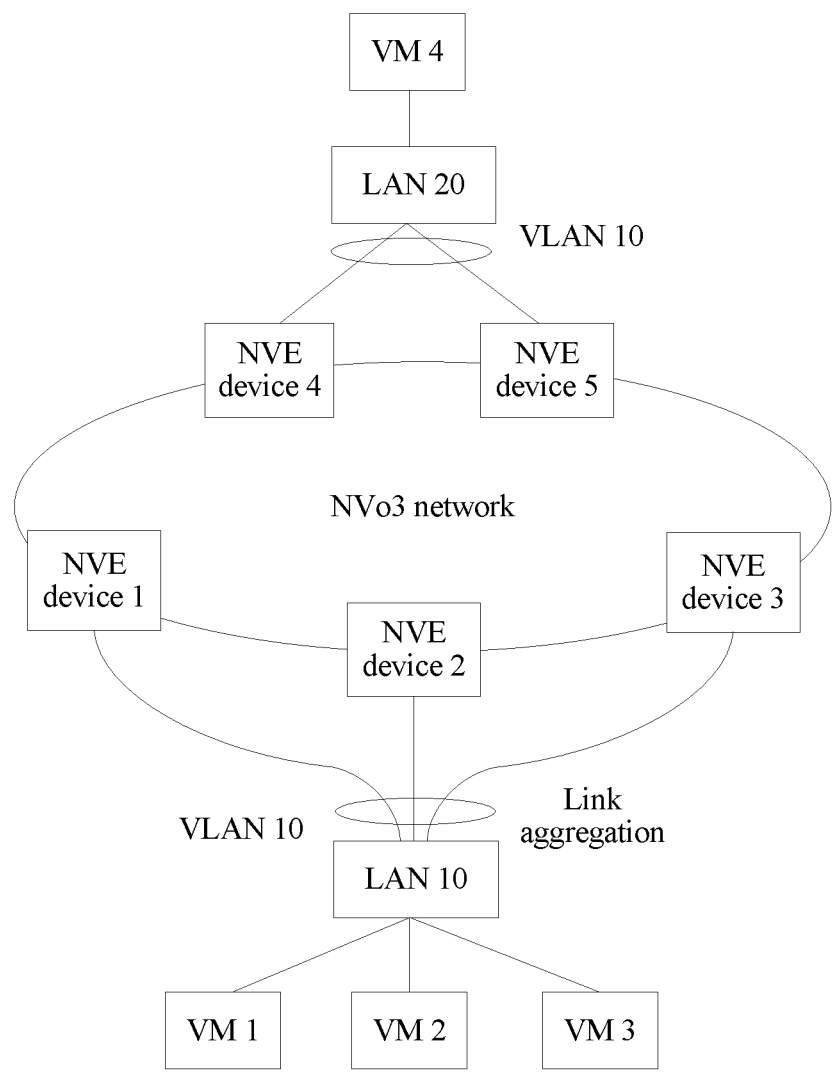
FIG. 1 is a schematic diagram of an NVo3 network according to an embodiment of the present disclosure.

Referring to a schematic diagram of a network shown in FIG. 1, an NVE device 1, an NVE device 2, an NVE device 3, an NVE device 4, and an NVE device 5 are all edge devices of an NVo3 network; a VM 1, a VM 2, and a VM 3 are virtual machines obtained by a physical server server 1 by performing operating system-level virtualization; and a VM 4 is a virtual machine obtained by a physical server server 2 by performing operating system-level virtualization. The server 1 and server 2 are servers in a data center (DC). The server 1 may be connected to the NVo3 network by using a local area network (LAN) device LAN 10, and the server 2 may be connected to the NVo3 network by using a LAN 20. The LAN 10 and the LAN 20 may be physical devices, or may be virtual devices. Optionally, the local area network device may be a switch, or may be a router.

For example, link aggregation is performed on a link between the NVE device 1 and the LAN 10, a link between the NVE device 2 and the LAN 10, and a link between the NVE device 3 and the LAN 10. For example, link bundling is performed on the foregoing three links by using a Multi-Chassis Link Aggregation Group (MC-LAG) technology, and the NVE device 1, the NVE device 2, and the NVE device 3 belong to one active-active-edge device group. The active-active-edge device group is a first active-active group, and the NVE device 1, the NVE device 2, and the NVE device 3 are all active-active members of the first active-active group. Likewise, active-active members of a second active-active group that is formed based on a link aggregation technology may be the NVE device 4 and the NVE device 5.

Active-active access may be understood as follows: in a packet transmission process, a VM may be connected to any one of multiple active-active members included in an active-active group, so as to send or receive a packet. For example, when the VM 1 provided by the server, 1 needs to be connected to the NVo3 network, the VM 1 may be connected to any one of the NVE device 1, the NVE device 2, and the NVE device 3.

In addition, with reference to an actual application requirement, a tenant may classify the VM 1, the VM 2, and the VM 3 into a first user group, and assign an identifier VLAN 10 of a virtual local area network (VLAN) of the LAN 10 to the first user group, that is, the VM 1, the VM 2, and the VM 3 may send a data packet to the LAN 10 by using the VLAN 10 of the LAN 10, and the LAN 10 may also forward the data packet to an NVE device by using the VLAN 10. Likewise, the tenant may further classify the VM 4 into a second user group, and assign the VLAN 10 of the LAN 20 to the second user group.

In actual application, the first user group may be connected in an active-active manner to the first active-active group, and the second user group may be connected in an active-active manner to the second active-active group. The following illustrates an active-active configuration manner in the embodiments of the present disclosure by using an example in which the first user group may be connected in an active-active manner to the first active-active group.

(1) An active-active access configuration information list is generated, and the list stores configuration information of each NVE device in the NVo3 network.

When the NVE device serves as a data sender, configuration information may include at least: an identifier of an active-active group, a Virtual Network Instance (VNI), and identifiers of at least two NVE devices that belong to the active-active group. When the NVE device serves as a data receiver, the configuration information may include at least: an identifier of an active-active group, a VNI, identifiers of at least two NVE devices that belong to the active-active group, and an address of a VM. Certainly, the NVE devices in the network may not be differentiated in the embodiments of the present disclosure, that is, whether the NVE device is a data sender or a data receiver, the configuration information of the NVE device may be presented as: the identifier of the active-active group, the VNI, the identifiers of the at least two NVE devices that belong to the active-active group, and the address of the VM. As a possible implementation manner, a correspondence between the foregoing configuration information may be established, that is, the active-active access configuration information list stores the configuration information of each NVE device in an entry format.

For example, from a perspective of the NVE device, the VNI in the embodiments of the present disclosure may be a specific instance of an overlay. For details, refer to description in the RFC7365 standard, which is not described herein.

For example, an identifier of the VM may be presented as a name of the VM and/or the address of the VM, where the address of the VM may be a media access control (MAC) address of the VM or an IP address of the VM.

For example, an identifier of the NVE device may be presented as a name of the NVE device and/or an address of the NVE device, where the address of the NVE device may be an IP address of the NVE device. For example, the IP address may be an IPv4 address or an IPv6 address.

For example, the identifier of the active-active group may be a number of the active-active group, for example, the first active-active group may be represented by a number 1, and the second active-active group may be represented by a number 2. Alternatively, considering that a VM in the user group is connected to the NVE device by using a configured LAN, the identifier of the active-active group may further be a LAN identifier used when the VM is connected to this active-active group, for example, the first active-active group may be represented by a LAN 10, and the second active-active group may be represented by a LAN 20.

For example, the VNI is mainly used for the NVE device to identify an active-active group having a data transmission requirement, and the VNI may be presented as a preset number such as a VNI 100. Optionally, identifying an active-active group having a data transmission requirement may be presented as: if the virtual network instance in the configuration information of the NVE device 1 is a VNI 100, the virtual network instance in the configuration information of the NVE device 4 is also a VNI 100. In this case, it may be determined that data transmission may be performed between the first active-active group to which the NVE device 1 belongs and the second active-active group to which the NVE device 4 belongs.

It should be noted that no specific limitation is imposed on a specific representation form of the identifiers of the NVE devices, the VNI, and the identifiers of the active-active groups in the embodiments of the present disclosure. In addition, a function of the VNI is not described in detail herein. For details, refer to the following illustration of an example shown in FIG. 3.

With reference to the foregoing description, the schematic diagram of the network shown in FIG. 1 is used as an example, and the active-active access configuration information list may include at least entries corresponding to the NVE device 1, the NVE device 2, the NVE device 3, the NVE device 4, and the NVE device 5. For example, an entry corresponding to each NVE device may be presented as follows:

The entry corresponding to the NVE device 1 may include: the LAN 10, the VNI 100, the IP address of the NVE device 1, and MAC addresses of the VM 1 to the VM 3.

The entry corresponding to the NVE device 2 may include: the LAN 10, the VNI 100, the IP address of the NVE device 2, and the MAC addresses of the VM 1 to the VM 3.

The entry corresponding to the NVE device 3 may include: the LAN 10, the VNI 100, the IP address of the NVE device 3, and the MAC addresses of the VM 1 to the VM 3.

The entry corresponding to the NVE device 4 may include: the LAN 20, the VNI 100, the IP address of the NVE device 4, and a MAC address of the VM 4.

The entry corresponding to the NVE device 5 may include: the LAN 20, the VNI 100, the IP address of the NVE device 5, and the MAC address of the VM 4.

Optionally, no specific limitation is imposed on a manner of generating the active-active access configuration information list in the embodiments of the present disclosure. As an example, the active-active access configuration information list may be described in a Yet Another Next Generation (YANG) language. Correspondingly, the configuration information in the foregoing entries may be presented as a tree-like structure shown in FIG. 2. In the figure, a hierarchical relationship between a root node and subnodes in the tree-like structure is represented by different indentation depths. It may be learned from the figure that the identifier of the active-active group is the root node, and a list of the VM, a list of the NVE device, and the VNI are the subnodes. The list of the VM includes an address of a VM that can be connected in an active-active manner to this active-active group, and the list of the NVE device includes identifiers of active-active members included in this active-active group. Optionally, to perform split horizon and port load balancing inside the NVE device, the list of the NVE device may further include an interface number.

(2) The foregoing generated active-active access configuration information list is sent to each NVE device in the NVo3 network.

As a possible implementation manner, the foregoing active-active access configuration information list may be generated by any device in the NVo3 network and sent, in a broadcast manner, to each NVE device. Alternatively, considering that the overlay in the embodiments of the present disclosure is a centralized and virtualized network, after the device generates the active-active access configuration information list, the list may be sent to a controller in a centralized network, and then the controller pushes the list to each NVE device in a broadcast manner. Furthermore, to maximize efficiency of performing active-active configuration in the embodiments of the present disclosure, the controller may further generate an active-active access configuration information list and deliver the active-active access configuration information list to each NVE device. No specific limitation is imposed on processes and manners of generating and delivering the list in the embodiments of the present disclosure, provided that each NVE device in the NVo3 network stores an active-active access configuration information list.

Correspondingly, the NVE device receiving the list may obtain at least the following information by using identifiers of the active-active groups in the list, so as to complete an active-active access configuration process:

(a) Determine whether this NVE device is an active-active device or a single-active device. If no other NVE device having a same active-active group identifier as this NVE device exists in the list, this NVE device is a single-active device; if another NVE device having a same active-active group identifier as this NVE device exists in the list, this NVE device is an active-active device.

It should be noted that the single-active device is a concept relative to the active-active device, which may be understood as follows: link bundling is not performed on another link and a link connected between a single-active NVE device and a switch, that is, the VM can be connected only to the single-active NVE device by using the switch.

(b) Determine an active-active group. NVE devices having a same active-active group identifier may be determined as an active-active group, and in this case, the NVE devices may learn active-active groups that exist in the network and active-active members included in each active-active group.

In actual application, the single-active device may also be considered as an active-active group, but the active-active group includes only one NVE device, and no specific limitation is imposed on this in the embodiments of the present disclosure.

It may be learned from the foregoing active-active access configuration process that, in the embodiments of the present disclosure, when active-active access configuration is performed, control signaling interaction is not required between the NVE devices, which may reduce consumption of network resources in the configuration process, and implement active-active access configuration simply and quickly.

The packet transmission solution provided in the embodiments of the present disclosure is mainly applied to a scenario in which there is a packet transmission requirement between virtual machines provided by different servers. For interaction between virtual machines provided by a same server, a packet may be forwarded by a forwarding device, for example, a data packet exchanged between the VM 1 and the VM 2 may be forwarded by using the LAN 10. The following illustrates a packet transmission method in the embodiments of the present disclosure with reference to a specific example.

Figure 3:
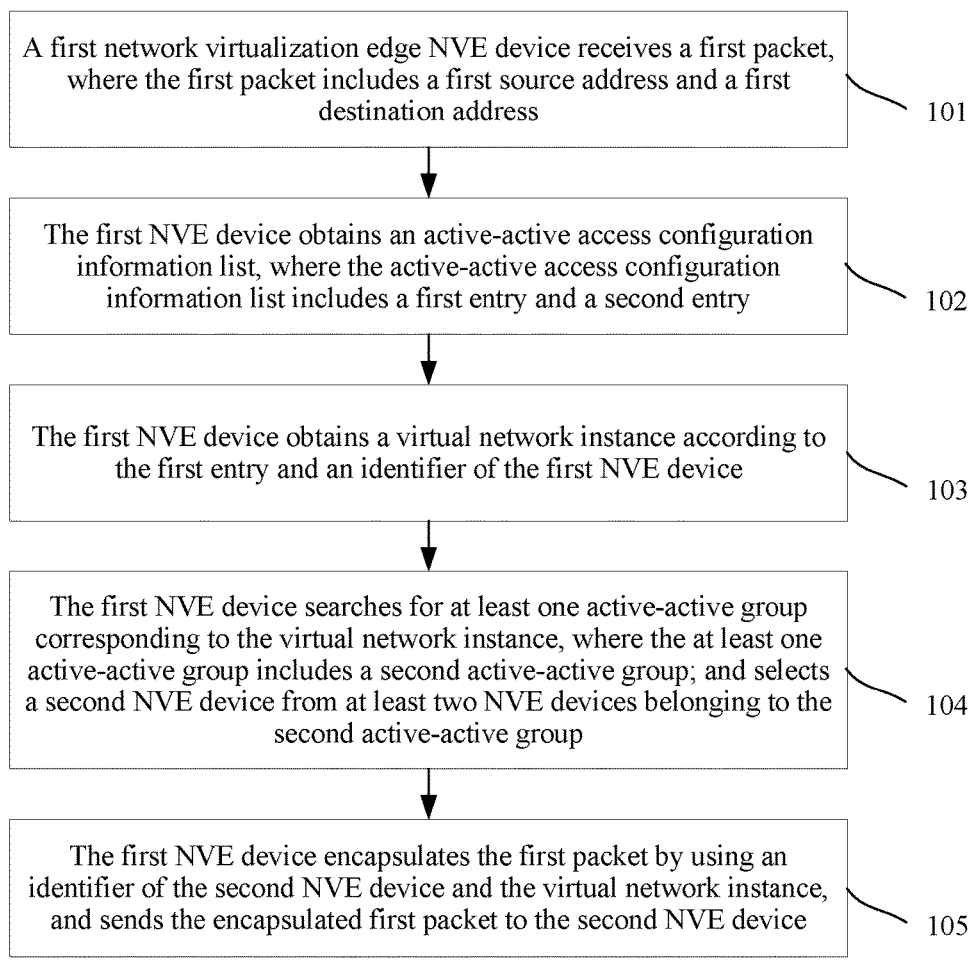
FIG. 3 is a flowchart of Embodiment 1 of a packet transmission method according to an embodiment of the present disclosure.

Refer to FIG. 3. FIG. 3 shows a flowchart of Embodiment 1 of a packet transmission method according to an embodiment of the present disclosure, where the method may include:

101. A first NVE device receives a first packet, where the first packet includes a first source address and a first destination address, the first source address is an address of a first virtual machine, and the first destination address is an address of a second virtual machine, where the first virtual machine is virtualized by a first physical server and the second virtual machine is virtualized by a second physical server.

Embodiment 1 shows an implementation manner in which the NVE device sends a packet, and the following uses a scenario in which the VM 1 sends a packet to the VM 4 in FIG. 1 as an example to illustrate a packet sending process of the NVE device in this embodiment of the present disclosure. In this example, a forwarding device may be presented as a switch.

When there is a data transmission requirement, the VM 1 may send a first packet to the LAN 10 by using a preconfigured VLAN 10. The first packet includes a first source address, a first destination address, and first load, where the first source address may be an address of the VM 1 and the first destination address may be an address of the VM 4. The switch stores a correspondence between a LAN and an NVE device, and aggregation information of a link connected between the LAN and the NVE device. Therefore, after the LAN 10 receives the first packet sent by using the VLAN 10, the LAN 10 may select an NVE device from the first active-active group, and forward, by using the VLAN 10, the first packet to the selected NVE device. For example, the LAN 10 may select an NVE device from the first active-active group by using a load balancing technology and according to current load statuses of the NVE device 1 to the NVE device 3.

For example, the NVE device selected by the LAN 10 is the NVE device 1, that is, the foregoing first NVE device is the NVE device 1, and Embodiment 1 shows a processing procedure of packet sending by the NVE device 1.

102. The first NVE device obtains an active-active access configuration information list, where the active-active access configuration information list includes a first entry and a second entry, where the first entry includes an identifier of a first active-active group, a virtual network instance, and an identifier of the first NVE device, and the second entry includes an identifier of a second active-active group, the virtual network instance, and identifiers of at least two NVE devices that belong to the second active-active group.

103. The first NVE device obtains the virtual network instance according to the first entry and the identifier of the first NVE device.

104. The first NVE device searches for at least one active-active group corresponding to the virtual network instance, where the at least one active-active group includes the second active-active group; and selects a second NVE device from the at least two NVE devices belonging to the second active-active group.

105. The first NVE device encapsulates the first packet by using an identifier of the second NVE device and the virtual network instance, and sending the encapsulated first packet to the second NVE device.

After receiving the first packet forwarded by the LAN 10, the NVE device 1 may obtain an active-active access configuration information list locally stored in the NVE device 1, and perform the following processing:

(1) The NVE device 1 reads an entry corresponding to the NVE device 1 in the list, and obtains a virtual network instance VNI 100 corresponding to the identifier of the NVE device 1.

(2) As a presentation of a function of the virtual network instance, the NVE device 1 may traverse entries in the list to search for at least one active-active group corresponding to the VNI 100, and select a second NVE device from a second active-active group included in the at least one active-active group. For example, the selected second NVE device is the NVE device 4.

For example, the second NVE device meets at least the following conditions: the second NVE device and the first NVE device belong to different active-active groups, and a virtual machine corresponding to the first destination address may be connected to the second NVE device. A manner of searching for the second NVE device in this embodiment of the present disclosure is not described in detail herein. For details, refer to three scenarios described below.

It should be noted that, it may be learned from the configuration information included in the entries that the VNI corresponds to the identifier of the active-active group, and the identifier of the active-active group uniquely corresponds to one active-active group, that is, there is a correspondence between the VNI and the active-active group.

(3) The NVE device 1 encapsulates the first packet by using the VNI 100 and the address of the NVE device 4, and sends the encapsulated first packet to the second NVE device, and the encapsulated first packet includes the VNI 100, the address of the NVE device 4, the address of the VM 1, the address of the VM 4, and the first load.

In comparison with a solution in the prior art that a tenant is isolated by using a VLAN, in this embodiment of the present disclosure, the first packet is encapsulated by using the VNI, and the tenant may be isolated in a manner of combining the VLAN with the VNI, so as to increase a quantity of tenants that may be isolated in the NVo3 network. This is another presentation of the function of the virtual network instance in this embodiment of the present disclosure.

With reference to actual application, there may be three scenarios of a process of selecting the second NVE device in this embodiment of the present disclosure:

Scenario 1: the first destination address exists in the list stored by the NVE device 1.

In this case, the NVE device 1 may find the second active-active group by using the VNI 100 and the address of the VM 4, and the second active-active group includes the NVE device 4 and the NVE device 5. The NVE device 1 may select an NVE device from the NVE device 4 and the NVE device 5 as a second NVE device, for example, the NVE device 1 selects the NVE device 4 as the second NVE device. For example, the NVE device 1 may randomly select the second NVE device from the NVE device 4 and the NVE device 5, or the NVE device 1 may select the second NVE device from the NVE device 4 and the NVE device 5 by using the load balancing technology. No specific limitation is imposed on a manner of selecting the second NVE device by the NVE device 1 in this embodiment of the present disclosure.

In this scenario, regardless of whether the first active-active group exchanges data with only one active-active group, the second active-active group may be accurately found, and the second NVE device may be selected form the second active-active group.

Scenario 2: the first destination address does not exist in the list stored by the NVE device 1, and the first active-active group can exchange data with only one active-active group.

In this case, the NVE device 1 may find the first active-active group and the second active-active group by using the VNI 100. The first active-active group includes the NVE device 1, the NVE device 2, and the NVE device 3, and the second active-active group includes the NVE device 4 and the NVE device 5. To avoid occurrence of routing loop, the NVE device 1 may screen out the first active-active group and reserve the second active-active group. Likewise, the NVE device 1 may select the second NVE device from the second active-active group.

Scenario 3: the first destination address does not exist in the list stored by the NVE device 1, and the first active-active group exchanges data with more than one active-active group.

For example, on the basis of the schematic diagram shown in FIG. 1, an NVE device 6 also exists in the NVo3 network, and if an entry corresponding to the NVE device 6 includes a LAN 30, the VNI 100, and an IP address of the NVE device 6, the NVE device 1 may find the first active-active group, the second active-active group, and a third active-active group by using the VNI 100. To avoid occurrence of routing loop, the NVE device 1 may screen out the first active-active group and reserve the second active-active group and the third active-active group. In this case, temporarily, the NVE device 1 cannot select an NVE device to which the VM 4 is connected, but it may be determined that the VM 4 can be connected to at least one of the second active-active group and the third active-active group, that is, the reserved two active-active groups include the second NVE device.

It may be understood that the first destination address exists in the list stored by the NVE device 1, that is, the entry corresponding to the NVE device 4 and the entry corresponding to the NVE device 5 in the list include the address of the VM 4. It should be noted that the address of the VM 4 may exist in the list when the list is generated, that is, the NVE device 1 locally stores the address of the VM 4 in a static configuration manner. Alternatively, the address of the VM 4 may be stored in the list by the NVE device 1 after dynamic learning, for example, the NVE device 1 may obtain, by using an Address Resolution Protocol (ARP) frame, a Reverse Address Resolution Protocol (RARP) frame, and a data frame, an address of a VM 4 that can be connected to the NVE device 4 and the NVE device 5. No specific limitation is imposed on a manner of obtaining the address of the VM 4 by the NVE device 1, and a manner of dynamic learning by the NVE device 1 in this embodiment of the present disclosure.

For the foregoing three scenarios in which the second NVE device is searched for, this embodiment of the present disclosure provides the following two manners of sending the encapsulated first packet.

Manner 1: If the NVE device 1 obtains the NVE device 4 in the scenario 1 or the scenario 2, that is, the NVE device 1 can determine an NVE device to which the VM 4 can be connected, the NVE device 1 may send the encapsulated first packet to the NVE device 4. Correspondingly, in this manner, an identifier that is of the second NVE device and that is used to encapsulate the first packet may be an IP address of the NVE device 4.

Manner 2: If the NVE device 1 obtains at least two active-active groups in the scenario 3, that is, the NVE device 1 cannot determine the NVE device to which the VM 4 can be connected, the NVE device 1 may send the encapsulated first packet to NVE devices belonging to the at least two active-active groups. Specifically, the NVE device 1 may send, by using a multicast technology, the encapsulated first packet to the NVE devices belonging to the at least two active-active groups, and correspondingly, in this manner, the identifier that is of the second NVE device and that is used to encapsulate the first packet may be an IP address of a multicast group. Alternatively, the NVE device 1 may send the encapsulated first packet to each of the NVE devices belonging to the at least two active-active groups, and correspondingly, in this manner, the identifier that is of the second NVE device and that is used to encapsulate the first packet may be an IP address of a corresponding NVE device. For example, the multicast group may include all NVE devices having the VNI 100, for example, the multicast group includes the NVE device 1, the NVE device 2, the NVE device 3, the NVE device 4, the NVE device 5, and the NVE device 6; or the multicast group may include all NVE devices that are reserved by the NVE device 1 and that have the VNI 100, for example, the multicast group includes the NVE device 4, the NVE device 5, and the NVE device 6. No specific limitation is imposed on multicast members included in the multicast group in this embodiment of the present disclosure.

In conclusion, a process of data exchange between virtual machines provided by two servers in an NVo3 network is implemented by using the solution provided in this embodiment of the present disclosure, particularly an implementation solution for packet sending involved in the exchange process.

Figure 4:
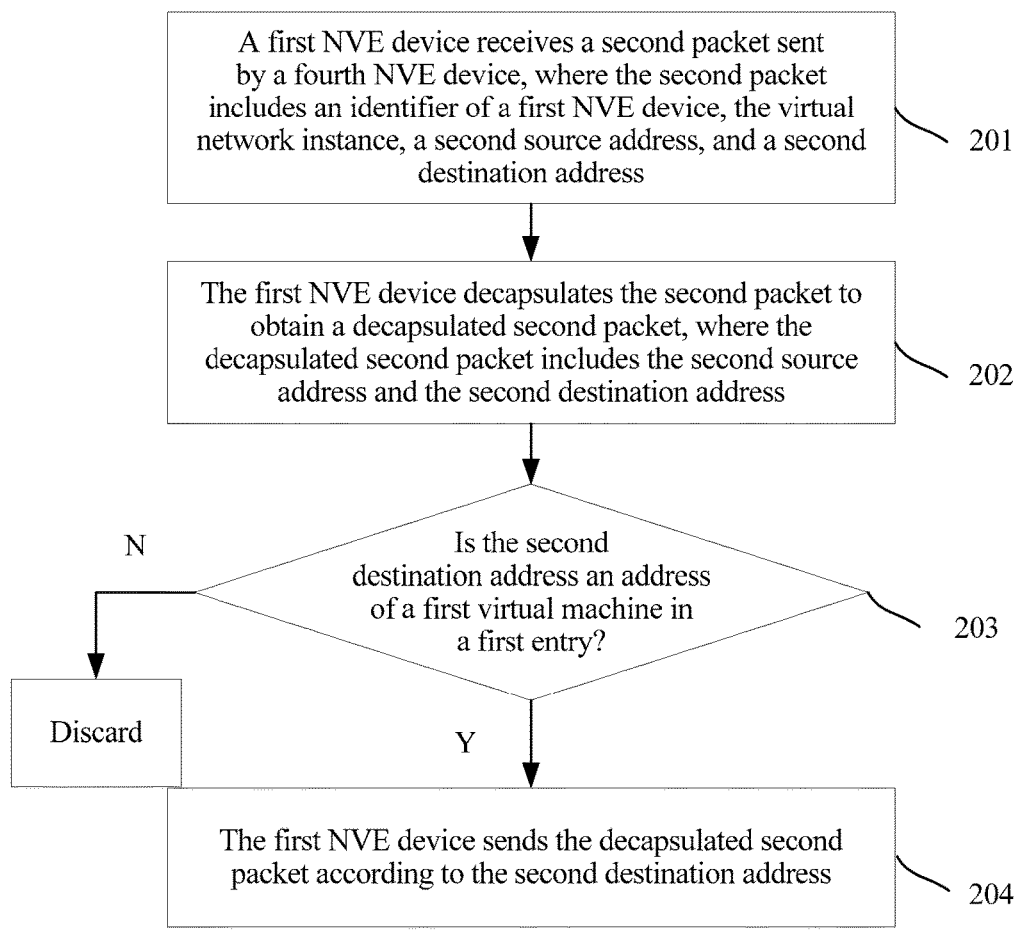
FIG. 4 is a flowchart of Embodiment 2 of a packet transmission method according to an embodiment of the present disclosure.

Refer to FIG. 4. FIG. 4 shows a flowchart of Embodiment 2 of a packet transmission method according to an embodiment of the present disclosure, where the method may include:

201. A first NVE device receives a second packet sent by a fourth NVE device, where the second packet includes an identifier of the first NVE device, a virtual network instance, a second source address, and a second destination address, where the second source address is an address of a third virtual machine, the second destination address is an address of a first virtual machine, and the third virtual machine is virtualized by a third physical server.

The first NVE device may not only send a packet to the second NVE device according to the process shown in FIG. 3, but also receive a packet sent by the fourth NVE device, and properly forward the received packet to a corresponding virtual machine. Embodiment 2 shows an implementation manner of receiving a packet by the NVE device.

For example, according to an actual communication requirement, the fourth NVE device may be the second NVE device in the embodiment shown in FIG. 3; or the fourth NVE device may be another NVE device except the second NVE device, and no specific limitation is imposed on this in this embodiment of the present disclosure. The following uses an example in which the VM 1 receives the packet sent by the VM 4 in FIG. 1 to illustrate a process of receiving the packet by the NVE device in this embodiment of the present disclosure. For example, the first NVE device may be the NVE device 1, the fourth NVE device may be the NVE device 4, the first virtual machine may be the VM 1, and the third virtual machine may be the VM 4.

When there is a data transmission requirement, the VM 4 may send a packet to the LAN 20 by using the preconfigured VLAN 10, and further forward the packet to the NVE device 4 by using the LAN 20. The NVE device 4 may encapsulate the packet according to the solution shown in FIG. 3 to generate a second packet. The second packet includes the VNI 100, the address of the NVE device 1, the address of VM 4, the address of the VM 1, and second load. In addition, the NVE device 4 may further find the NVE device 1 to the NVE device 3, and the NVE device 6 by using the VNI 100 and according to the locally stored active-active access configuration information list (the address of the VM 1 does not exist in the list), and learn, according to the LAN, that the NVE device 1 to the NVE device 3, and the NVE device 6 do not belong to a same active-active group. Temporarily, the NVE device 4 cannot determine an NVE device to which the VM 1 is connected. Therefore, as an example, the NVE device 4 may send the second packet to the NVE device 1 to the NVE device 3, and the NVE device 6 by using the multicast technology, and correspondingly, the address of the NVE device 1 may be presented as an address of a multicast group to which the NVE device 1 belongs. This step is that the NVE device 1 receives the second packet that is sent by the NVE device 4 by using the multicast technology.

202. The first NVE device decapsulates the second packet to obtain a decapsulated second packet, where the decapsulated second packet includes the second source address and the second destination address.

203. The first NVE device determines whether the second destination address is the address of the first virtual machine in a first entry.

204. If the second destination address is the address of the first virtual machine in the first entry, the first NVE device sends the decapsulated second packet according to the second destination address.

After receiving the second packet forwarded by the NVE device 4, the NVE device 1 may determine, according to the identifier of the first NVE device included in the second packet, whether the second packet is a packet that is sent to the NVE device 1. If the identifier of the first NVE device is the address of the NVE device 1, it may be determined that the NVE device 1 is an authorized receiver of the second packet, and the NVE device 1 may perform subsequent processing on the second packet according to the solution in this embodiment of the present disclosure. If the identifier of the first NVE device is not the address of the NVE device 1, it may be determined that the NVE device 1 is not an authorized receiver of the second packet, and the NVE device 1 may discard the second packet, and no specific limitation is imposed on this in this embodiment of the present disclosure.

If the NVE device 1 determines that the NVE device 1 is the authorized receiver of the second packet, the NVE device 1 may perform the following subsequent processing on the second packet according to the solution in this embodiment of the present disclosure:

(1) To implement packet transmission from the NVE device 1 to the VM 1, the NVE device 1 may perform decapsulation processing on the second packet, and remove a VNI 100 and an address of the multicast group that are encapsulated by the NVE device 4, so as to obtain the decapsulated second packet. The decapsulated second packet includes the address of the VM 4, the address of the VM 1, and third load.

(2) The NVE device 1 reads the entry corresponding to the NVE device 1 in the locally stored list, and determines whether the VM 1 can be connected to the NVE device 1. If the VM 1 can be connected to the NVE device 1, the NVE device 1 may send the decapsulated second packet to the VM 1 by using the LAN 10, so as to complete receiving and forwarding of the second packet. For example, a manner of determining whether the VM 1 can be connected to the NVE device 1 is determining whether the list of the VM in the entry corresponding to the NVE device 1 includes the address of the VM 1. If the list includes the address of the VM 1, it indicates that the VM 1 can be connected to the NVE device 1. If the list does not include the address of the VM 1, it indicates that the VM 1 cannot be connected to the NVE device 1. Optionally, no specific limitation is imposed on a processing procedure in a scenario in which the VM 1 cannot be connected to the NVE device 1 in this embodiment of the present disclosure. As an example, when determining that the VM 1 cannot be connected to the NVE device 1, the NVE device 1 may discard the second packet.

Optionally, to prevent multiple active-active members that belong to one active-active group from repeatedly sending the decapsulated second packet to the first virtual machine, the active-active members may further store priority information. If the fourth NVE device sends, by using the multicast technology, a second packet to the at least two NVE devices belonging to the second active-active group and at least two NVE devices belonging to the third active-active group, after receiving the second packet, the first NVE device may first determine, according to the priority information, whether the first NVE device has a highest priority in the active-active group to which the first NVE device belongs. If the first NVE device has a highest priority, the first NVE device may perform decapsulation processing on the second packet, and send the decapsulated second packet to the first virtual machine. If the first NVE device does not have a highest priority, the first NVE device may discard the second packet, and no specific limitation is imposed on this in this embodiment of the present disclosure.

In conclusion, a process of data exchange between virtual machines provided by two servers in an NVo3 network is implemented by using the solution provided in this embodiment of the present disclosure, particularly an implementation solution for packet receiving involved in the exchange process.

Figure 5:
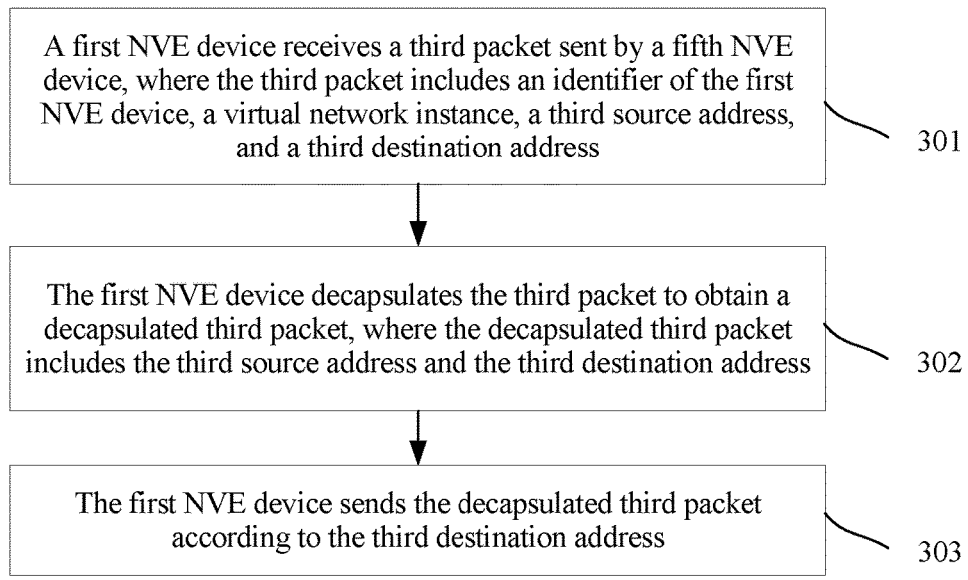
FIG. 5 is a flowchart of Embodiment 3 of a packet transmission method according to an embodiment of the present disclosure.

Refer to FIG. 5. FIG. 5 shows a flowchart of Embodiment 3 of a packet transmission method according to an embodiment of the present disclosure, where the method may include:

301. A first NVE device receives a third packet sent by a fifth NVE device, where the third packet includes an identifier of the first NVE device, a virtual network instance, a third source address, and a third destination address, where the third source address is an address of a fourth virtual machine, the third destination address is an address of a first virtual machine, and the fourth virtual machine is obtained by means of virtualization by a fourth physical server.

The first NVE device may not only send a packet to the second NVE device according to the process shown in FIG. 3, but also receive a packet sent by the fifth NVE device, and properly forward the received packet to a corresponding virtual machine. Embodiment 3 shows an implementation manner of receiving a packet by the NVE device.

For example, according to an actual communication requirement, the fifth NVE device may be the second NVE device in the embodiment shown in FIG. 3; or the fifth NVE device may be another NVE device except the second NVE device, and no specific limitation is imposed on this in this embodiment of the present disclosure. The following uses an example in which the VM 1 receives the packet sent by the VM 4 in FIG. 1 to illustrate a process of receiving the packet by the NVE device in this embodiment of the present disclosure. For example, the first NVE device may be the NVE device 1, the fifth NVE device may be the NVE device 4, the first virtual machine may be the VM 1, and the fourth virtual machine may be the VM 4.

When there is a data transmission requirement, the VM 4 may send a packet to the LAN 20 by using the preconfigured VLAN 10, and further forward the packet to the NVE device 4 by using the LAN 20. The NVE device 4 may encapsulate the packet according to the solution shown in FIG. 3 to generate a third packet. The third packet includes the VNI 100, the address of the NVE device 1, the address of VM 4, the address of the VM 1, and the third load. In addition, the NVE device 4 may further find the NVE device 1 to the NVE device 3 by using the VNI 100 and the address of the VM 1, and according to the locally stored active-active access configuration information list (the address of the VM 1 exists in the list), and learn, according to the LAN 10, that the NVE device 1 to the NVE device 3 belong to a same active-active group. Therefore, the NVE device 4 may select the NVE device 1 by using a load balancing technology, and route the third packet to the NVE device 1 by using a unicast technology. This step is that the NVE device 1 receives the third packet that is sent by the NVE device 4 by using the unicast technology.

302. The first NVE device decapsulates the third packet to obtain a decapsulated third packet, where the decapsulated third packet includes the third source address and the third destination address.

303. The first NVE device sends the decapsulated third packet according to the third destination address.

After receiving the third packet forwarded by the NVE device 4, the NVE device 1 may determine, according to the identifier of the first NVE device included in the third packet, whether the NVE device 1 is an authorized receiver of the third packet. For a specific determining manner, refer to the description in FIG. 4, and details are not described herein.

If the NVE device 1 determines that the NVE device 1 is the authorized receiver of the third packet, the NVE device 1 may perform the following subsequent processing on the third packet according to the solution in this embodiment of the present disclosure:

(1) To implement packet transmission from the NVE device 1 to the VM 1, the NVE device 1 may perform decapsulation processing on the third packet, and remove the VNI 100 and the address of the NVE device 1 that are encapsulated by the NVE device 4, so as to obtain a decapsulated third packet. The decapsulated third packet includes the address of the VM 4, the address of the VM 1, and the third load.

(2) The NVE device 1 sends the decapsulated third packet to the VM 1 by using the LAN 10 and by using the address of the VM 1, so as to complete receiving and forwarding of the third packet.

In conclusion, a process of data exchange between virtual machines provided by two servers in an NVo3 network is implemented by using the solution provided in this embodiment of the present disclosure, particularly an implementation solution for packet receiving involved in the exchange process.

In the foregoing description, FIG. 3, FIG. 4, and FIG. 5 show a packet transmission solution of combining an NVo3 technology and an active-active access technology. The following further illustrates a packet transmission process in the embodiments of the present disclosure with reference to a specific example.

1. An active-active access configuration information list is generated according to active-active access information that is set by a tenant.

Considering that a YANG data model language may be easily converted into an Extensible Markup Language (XML) format, and a relationship between data may be concisely described by using a tree-like structure. In this embodiment of the present disclosure, the YANG data model language may be used to compile the active-active access information that is set by the tenant, so as to generate an active-active access configuration information list.

As an example, a manner in which the controller generates a list based on the YANG data model language may be presented as follows:

```
(1) defining a data type
    typedef NVE-ID {
        type union {
            type inet:ipv4-address;
            type inet:ipv6-address;
        }
    }
```

```
                        description
                                "Defines addresses of different nves, MAC, IPv4 or IPv6";
                        }
                typedef END-DEVICE-ID{
                        type string;
                        description
                                "The identification of the end device that is multi-attached to those
NVEs given by the 'nve-list'; If the end device is an MC-LAG, it's an 8-octet value ID
according to Section 5.3.2 in 802.1ax-2008";
                }
                typedef VNI {
                                type uint32{
                                    range "1 .. 16777215";
                                }
                                description
                                        "Virtual Network Instance (VNI)";
                                }
                typedef TS-ADDRESS{
                        type union{
                                type yang:mac-address;
                                type inet:ipv4-address;
                                ype inet:ipv6-address;
                        }
                        description
                                "The address of the Tenant System";
                }
    (2) establishing an association relationship between data
                list active-active-nve-groups{
                key "end-id";
                leaf end-id{
                        type END-DEVICE-ID;
                        description
                                "The identification of the end device that is multi-attached to the NVEs
given in the 'nve-list'.";
                        }
                        container multi-attached-info{
                                list nve-list{
                                        key "nve-id";
                                        leaf nve-id{
                                            type NVE-ID;
                                        }
                                        description
                                            "Any NVE can deliver traffic of any VNI in the 'vni-list' in this
container";
                                        leaf priority {
                                                type enumeration {
                                                        enum primary {
                                                            value "1";
                                                            description
                                                                "Primary egress NVE.";
                                                        }
                                                        enum backup {
                                                            value "2";
                                                            description
                                                                "Backup egress NVE.";
                                                        }
                                                }
                                                description
                                                        "Simple priority for distinguishing between primary and backup
egress NVEs in an AANVE for BUM packets.
                                                        Backup egress NVEs MUST NOT egress a BUM packet.";
                                        }
                                        leaf-list vap-list{
                                                type if:interface-ref;
                                                description
                                                        "This nve uses these interfaces to attach the end device link
identified by the 'end-id'. These interfaces MUST NOT egress any packet whose source NVE
is listed in the 'nve-list'";//split horizon
                                        }
                                }
                                leaf vni {
                                        type VNI;
                                        description
                                            "A VNI enabled for the end device identified by the
                                                'end-id'";
                                }
                                leaf-list attached-ts-addresses{
                                        type TS-ADDRESS;
                                        description
```

-continued

```
            "The list of the Tenant System Addresses that are
            connected to the end device identified by the 'end-id'. For
            any address in this list, the remote nve can sent traffic
            towards it within the 'vni' via any nve given in the
            nve-list'";
        }
    }
```

2. The active-active access configuration information list is delivered to each NVE device in the NVo3 network, and active-active access information of the NVo3 network is configured.

The controller delivers the generated list to each NVE device in the NVo3 network in a broadcast manner. All NVE devices in the NVo3 network may support the Network Configuration (Netconf) protocol, may analyze the tree-like structure described in the YANG data model language, and may identify active-active groups that exist in the NVo3 network and active-active members included in each active-active group.

For example, in the foregoing example in FIG. 1, it may be identified that two active-active groups exist in the NVo3 network, where the active-active members included in the first active-active group are the NVE device 1 to the NVE device 3, and the active-active members included in the second active-active group are the NVE device 4 and the NVE device 5.

The following uses a process of interaction between the VM 1 and the VM 4 as an example to illustrate the solution in this embodiment of the present disclosure.

3. The VM 1 sends a request packet to the VM 4, where the request packet includes the MAC address of the VM 1, the MAC address of the VM 4, and request data.

First, the VM 1 sends, by using the VLAN 10, the request packet to a LAN 10 connected to the VM 1, and the LAN 10 learns, according to a correspondence between a LAN and an NVE device stored in the LAN 10, and link bundling information, that the request packet may be sent, by using any NVE device of the NVE device 1 to the NVE device 3, to a remote NVE device to which the VM 4 is connected. In this case, if the LAN 10 selects, according to the load balancing technology, the NVE device 1 as a processing device for packet forwarding this time, the LAN 10 may forward the request packet to the NVE device 1 by using the VLAN 10. It should be noted that in the foregoing manner of generating the list based on the YANG data model language, end-id may be presented as a LAN identifier.

It should be noted that, that the VM 1 may be connected in an active-active manner to the NVE device 1 to the NVE device 3 may be understood as follows: the VM 1 may be connected to any one of the NVE device 1 to the NVE device 3; or more specifically, a data flow transmitted by the VM 1 may be connected to any one of the NVE device 1 to the NVE device 3, that is, more specifically to a data flow sent to a specified VLAN and VM. For example, when the VM 1 sends a flow 1 to the VM 4 by using the VLAN 10, the VM 1 may be connected to the NVE device 1, and forward the flow 1 by using the NVE device 1; or when the VM 1 sends a flow 2 to the VM 4 by using the VLAN 20, the VM 1 may be connected to the NVE device 2, and forward the flow 2 by using the NVE device 2, and so on. No specific limitation is imposed on this in this embodiment of the present disclosure.

Then, the NVE device 1 receives the request packet, reads the locally stored active-active access configuration information list, and searches for the remote NVE device.

For example, the list locally stored in the NVE device 1 records the following entries:

The entry corresponding to the NVE device 1 includes: the LAN 10, the VNI 100, the IP address of the NVE device 1, and the MAC addresses of the VM 1 to the VM 3.

The entry corresponding to the NVE device 4 includes: the LAN 20, the VNI 100, and the IP address of the NVE device 4.

The entry corresponding to the NVE device 5 includes: the LAN 20, the VNI 100, and the IP address of the NVE device 5.

That is, an address of the VM in the list that is generated by the controller is blank, and the NVE device 1 may know a MAC address of a VM that can be connected to the NVE device 1. In addition, the NVE device 1 needs to perform dynamic learning to know a MAC address of a VM that can be connected to the NVE device 4, and a MAC address of a VM that can be connected to the NVE device 5.

Therefore, the NVE device 1 may find, according to the VNI 100, an NVE device 4 and an NVE device 5 that can exchange data with the active-active group to which the NVE device 1 belongs, and may learn, according to the LAN 20, that the NVE device 4 and the NVE device 5 belong to a same active-active group, and therefore, the NVE device 1 may select, according to the load balancing technology, the NVE device 4 as the remote NVE device for packet forwarding this time.

Next, the NVE device 1 encapsulates the request packet, and routes the encapsulated request packet to the remote NVE device.

To implement request packet transmission between the NVE device 1 and the NVE device 4, the NVE device 1 may encapsulate, in the request packet, the IP address of the NVE device 4; and in addition, to increase a quantity of tenants that may be isolated in this embodiment of the present disclosure, the VNI 100 may be encapsulated in the request packet, and a tenant is identified in a manner of combining the VLAN 10 with the VNI 100. After the processing, the NVE device 1 may forward the encapsulated request to the NVE device 4 in a unicast manner.

It should be noted that only an entry corresponding to the processing device that may be involved in a process of packet forwarding this time is illustrated herein, which does not indicate that the list locally stored in the NVE device 1 records only the above-listed entries.

In addition, after finding the NVE device 4 and the NVE device 5, the NVE device 1 may further determine the NVE device 4 and the NVE device 5 as remote NVE devices, and send the request packet to the NVE device 4 and the NVE device 5 by using the multicast technology. No specific limitation is imposed on this in this embodiment of the present disclosure, provided that the request packet is sent to an NVE device to which the VM 4 can be connected.

Finally, the NVE device 4 receives the encapsulated request packet forwarded by the NVE device 1, and sends the encapsulated request packet to the VM 4.

The NVE device 4 may determine, according to an IP address of the NVE device 4 in the encapsulated request packet, that the NVE device 4 is an authorized receiver of the encapsulated request packet. The NVE device 4 may perform decapsulation to restore the request packet, and forward the request packet to the VM 4 by using the LAN 20 and according to the MAC address of the VM 4 included in the request packet, so as to implement the packet transmission from the VM 1 to the VM 4.

3. The VM 4 sends a response packet to the VM 1, where the response packet includes the MAC address of the VM 4, the MAC address of the VM 1, and response data.

After receiving the request packet sent by the VM 1, the VM 4 may perform a series of processing (which may be determined according to an actual requirement, and no specific limitation is imposed on this in this embodiment of the present disclosure) according to the request packet, and return response data to the VM 1 by using the response packet.

First, the VM 4 sends, by using the VLAN 10, the response packet to the LAN 20 connected to the VM 4, and the LAN 20 determines, according to the correspondence between a LAN and an NVE device stored in the LAN 20, and the link bundling information, that either of the NVE device 4 and the NVE device 5 can send the response packet to a remote NVE device to which the VM 1 is connected. In this case, if the LAN 20 selects, according to the load balancing technology, the NVE device 5 as a processing device for packet forwarding this time, the LAN 20 may forward the response packet to the NVE device 5 by using the VLAN 10.

Then, the NVE device 5 receives the response packet, reads the locally stored active-active access configuration information list, and searches for the remote NVE device. For example, after finding the NVE device 1 to the NVE device 3 that belong to the same active-active group, the NVE device 5 may select, according to the load balancing technology, the NVE device 2 as the remote NVE device for packet forwarding this time.

For a manner of searching for the remote NVE device by the NVE device 5, refer to the foregoing description, and details are not described herein.

Next, the NVE device 5 encapsulates the response packet, and sends the encapsulated response packet to the remote NVE device. The encapsulated response packet includes the VNI 100, the IP address of the NVE device 2, the MAC address of the VM 4, the MAC address of the VM 1, and the response data.

Finally, after the NVE device 2 receives the encapsulated response packet forwarded by the NVE device 5, and performs decapsulation to restore the response packet. The NVE device 2 forwards the response packet to the VM 1 by using the LAN 10 and according to the MAC address of the VM 1 included in the response packet, so as to implement the packet transmission from the VM 4 to the VM 1.

In conclusion, a process of data exchange between virtual machines provided by two servers in an NVo3 network is implemented by using the solution provided in this embodiment of the present disclosure. It should be noted that in the foregoing examples, both the source address and the destination address in the packet are illustrated by using the MAC address as an example. According to different network layers at which the VM is located, the source address and the destination address may further be presented as IP addresses, and no specific limitation is imposed on this in this embodiment of the present disclosure. It should be noted that if the source address and the destination address are presented as IP addresses, the forwarding device should be a router. For a specific packet transmission solution, refer to the foregoing description, and details are not described herein.

In addition, in the foregoing examples, the two servers belong to a same data center. In an actual application process, there may be a requirement of interaction crossing data centers. For example, the server 1 belongs to a data center 1 and the server 2 belongs to a data center 2, and in this case, when encapsulating the request packet, the NVE device 1 may further encapsulate an identifier of the data center 2 into the request packet. Therefore, the NVE device 1 may send the encapsulated request packet to the NVE device 4 by using the identifier of the data center 2 and the identifier of the NVE device 4, so as to implement packet forwarding crossing data centers. For example, the NVE device 1 may obtain the identifier of the data center 2 from a router crossing data centers, and no specific limitation is imposed on this in this embodiment of the present disclosure.

Figure 6:
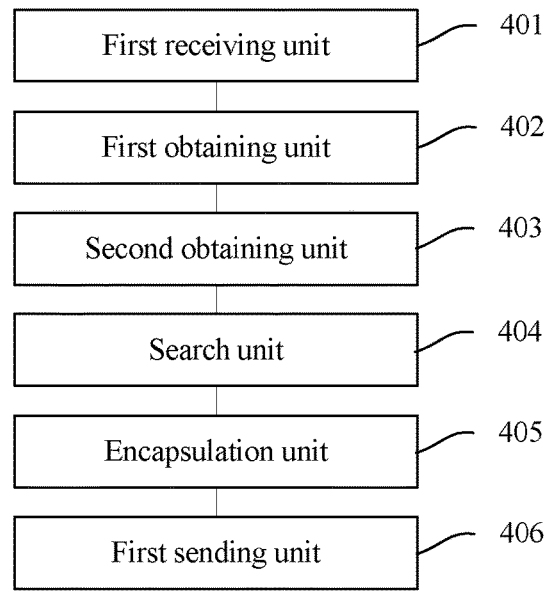
FIG. 6 is a schematic diagram of a packet transmission apparatus according to an embodiment of the present disclosure.

Corresponding to the method shown in FIG. 3, an embodiment of the present disclosure further provides a packet transmission apparatus. Referring to a schematic diagram shown in FIG. 6, the apparatus may include:

a first receiving unit 401, configured to receive a first packet, where the first packet includes a first source address and a first destination address, the first source address is an address of a first virtual machine, and the first destination address is an address of a second virtual machine, where the first virtual machine is virtualized by a first physical server and the second virtual machine is virtualized by a second physical server;

a first obtaining unit 402, configured to obtain an active-active access configuration information list after the first receiving unit receives the first packet, where the active-active access configuration information list includes a first entry and a second entry, where the first entry includes an identifier of a first active-active group, a virtual network instance, and an identifier of a first NVE device, and the second entry includes an identifier of a second active-active group, the virtual network instance, and identifiers of at least two NVE devices that belong to the second active-active group;

a second obtaining unit 403, configured to obtain, according to the first entry and the identifier of the first NVE device, the virtual network instance from the active-active access configuration information list obtained by the first obtaining unit;

a search unit 404, configured to search for at least one active-active group corresponding to the virtual network instance in the active-active access configuration information list obtained by the first obtaining unit, where the at least one active-active group includes the second active-active group; and select a second NVE device from the at least two NVE devices belonging to the second active-active group;

an encapsulation unit 405, configured to encapsulate the first packet by using an identifier of the second NVE device and the virtual network instance; and a first sending unit 406, configured to send the first packet encapsulated by the encapsulation unit to the second NVE device.

The packet transmission apparatus in this embodiment of the present disclosure may be integrated into an NVE device in an NVo3 network, and be applied to the method embodiment shown in FIG. 3 to implement a function of the first NVE device. When a packet needs to be forwarded, the packet transmission apparatus may find the second NVE device by using a locally stored active-active access configuration information list, and forward a packet to the second NVE, so as to implement a process of data exchange between virtual machines provided by two servers in the NVo3 network, particularly an implementation solution for packet sending involved in the exchange process.

Optionally, the first obtaining unit is specifically configured to receive the active-active access configuration information list from a controller.

Optionally, the active-active access configuration information list obtained by the first obtaining unit is described in a Yet Another Next Generation (YANG) language, and the first entry carries the identifier of the first active-active group, the virtual network instance, and the identifier of the first NVE device by using a tree-like structure, where the identifier of the first active-active group is a root node, and the identifier of the first NVE device and the virtual network instance are subnodes.

Optionally, the active-active access configuration information list further includes a third entry, where the third entry includes an identifier of a third active-active group, the virtual network instance, and identifiers of at least two NVE devices that belong to the third active-active group; and the at least one active-active group includes the second active-active group and the third active-active group; and the first sending unit is specifically configured to determine whether the second entry further includes the address of the second virtual machine; and when the second entry further includes the address of the second virtual machine, search for the second active-active group corresponding to the address of the second virtual machine, and send the encapsulated first packet to the second NVE device.

Optionally, the first sending unit is further configured to: when the second entry does not include the address of the second virtual machine, send the encapsulated first packet to the at least two NVE devices belonging to the second active-active group, and the at least two NVE devices belonging to the third active-active group.

Optionally, the first entry includes the identifier of the first active-active group, the virtual network instance, the identifier of the first NVE device, and the address of the first virtual machine, and the apparatus further includes:

a second receiving unit, configured to receive a second packet sent by a fourth NVE device, where the second packet includes the identifier of the first NVE device, the virtual network instance, a second source address, and a second destination address, where the second source address is an address of a third virtual machine, the second destination address is the address of the first virtual machine, and the third virtual machine is virtualized by a third physical server;

a decapsulation unit, configured to decapsulate the second packet to obtain a decapsulated second packet, where the decapsulated second packet includes the second source address and the second destination address;

a determining unit, configured to determine whether the second destination address is the address of the first virtual machine in the first entry; and a second sending unit, configured to: when the determining unit determines that the second destination address is the address of the first virtual machine in the first entry, send the decapsulated second packet according to the second destination address.

Optionally, the apparatus further includes:

a third receiving unit, configured to receive a third packet sent by a fifth NVE device, where the third packet includes the identifier of the first NVE device, the virtual network instance, a third source address, and a third destination address, where the third source address is an address of a fourth virtual machine, the third destination address is the address of the first virtual machine, and the fourth virtual machine is obtained by means of virtualization by a fourth physical server;

a second decapsulation unit, configured to decapsulate the third packet received by the third receiving unit, so as to obtain a decapsulated third packet, where the decapsulated third packet includes the third source address and the third destination address; and a third sending unit, configured to send the decapsulated third packet according to the third destination address.

In the foregoing optional solution, for an additional function that may be implemented by the packet transmission apparatus in this embodiment of the present disclosure, refer to description of an additional function of the first NVE in the method embodiment, and details are not described herein.

In addition, when the packet transmission apparatus provided in the foregoing embodiment sends a packet, description is given only by using division of the foregoing functional modules as an example. In actual application, the functions may be allocated to different functional modules for implementation according to a requirement. That is, an internal structure of the apparatus is divided into different functional modules to implement all or a part of the functions described above.

Corresponding to the method shown in FIG. 3, an embodiment of the present disclosure further provides a packet transmission device 500. Referring to a schematic diagram shown in FIG. 7, the device may include: a processor 501, a memory 502, a network interface 503, and a bus system 504.

The bus system 504 is configured to connect the processor 501, the memory 502, and the network interface 503.

The network interface 503 is configured to implement a communication connection between the device and another network device. The network interface 503 may be implemented by an optical transceiver, an electrical transceiver, a wireless transceiver, or any combination thereof. For example, the optical transceiver may be a small form-factor pluggable transceiver (SFP), an enhanced small form-factor pluggable (SFP+) transceiver, or a 10 Gigabit small form-factor pluggable (XFP) transceiver. The electrical transceiver may be an Ethernet network interface controller (NIC). The wireless transceiver may be a wireless network interface controller (WNIC).

The memory 502 is configured to store a program instruction and data. The memory 502 may include a volatile memory, for example, a random access memory (RAM). The memory may also include a non-volatile memory, for example, a flash memory (flash memory), a hard disk drive (HDD), or a solid-state drive (SSD). The memory may further include a combination of the foregoing types of memories.

The processor 501 is a central processing unit (CPU), or may be a combination of a CPU and a hardware chip. The hardware chip may be one or a combination of the following: an application-specific integrated circuit (ASIC), a field-programmable gate array (FPGA), a complex programmable logic device (CPLD), or a network processor (NP). The processor 501 is configured to read the program instruction and the data that are stored in the memory 502, and execute the following operations:

receiving, by the processor, a first packet by using the network interface, where the first packet includes a first source address and a first destination address, the first source address is an address of a first virtual machine, and the first destination address is an address of a second virtual machine, where the first virtual machine is virtualized by a first physical server and the second virtual machine is virtualized by a second physical server;

obtaining, by the processor, an active-active access configuration information list, where the active-active access configuration information list includes a first entry and a second entry, where the first entry includes an identifier of a first active-active group, a virtual network instance, and an identifier of a first NVE device, and the second entry includes an identifier of a second active-active group, the virtual network instance, and identifiers of at least two NVE devices that belong to the second active-active group;

obtaining, by the processor, the virtual network instance according to the first entry and the identifier of the first NVE device;

searching, by the processor, for at least one active-active group corresponding to the virtual network instance, where the at least one active-active group includes the second active-active group; and selecting a second NVE device from the at least two NVE devices belonging to the second active-active group; and encapsulating, by the first processor, the first packet by using an identifier of the second NVE device and the virtual network instance, and sending the encapsulated first packet to the second NVE device by using the network interface.

The packet transmission device in this embodiment of the present disclosure may be presented as an NVE device in the NVo3 network. When a packet needs to be forwarded, the packet transmission device may find the second NVE by using a locally stored active-active access configuration information list, and forward a packet to the second NVE, so as to implement a process of data exchange between virtual machines provided by two servers in the NVo3 network, particularly an implementation solution for packet sending involved in the exchange process.

Optionally, the obtaining, by the processor, an active-active access configuration information list includes: obtaining, by the processor, the active-active access configuration information list from a controller.

Optionally, the active-active access configuration information list obtained by the processor is described in a Yet Another Next Generation (YANG) language, and the first entry carries the identifier of the first active-active group, the virtual network instance, and the identifier of the first NVE device by using a tree-like structure, where the identifier of the first active-active group is a root node, and the identifier of the first NVE device and the virtual network instance are subnodes.

Optionally, the active-active access configuration information list further includes a third entry, where the third entry includes an identifier of a third active-active group, the virtual network instance, and identifiers of at least two NVE devices that belong to the third active-active group; and the at least one active-active group includes the second active-active group and the third active-active group; and the sending, by the processor, the encapsulated first packet to the second NVE device includes:

determining, by the processor, whether the second entry further includes the address of the second virtual machine; and if the second entry further includes the address of the second virtual machine, searching, by the processor, for the second active-active group corresponding to the address of the second virtual machine, and sending the encapsulated first packet to the second NVE device.

Optionally, if the second entry does not include the address of the second virtual machine, the processor sends the encapsulated first packet to the at least two NVE devices belonging to the second active-active group, and the at least two NVE devices belonging to the third active-active group.

Optionally, the first entry includes the identifier of the first active-active group, the virtual network instance, the identifier of the first NVE device, and the address of the first virtual machine, and the processor may further execute the following operations:

receiving, by the processor, a second packet sent by a fourth NVE device, where the second packet includes the identifier of the first NVE device, the virtual network instance, a second source address, and a second destination address, where the second source address is an address of a third virtual machine, the second destination address is the address of the first virtual machine, and the third virtual machine is virtualized by a third physical server;

decapsulating, by the processor, the second packet to obtain a decapsulated second packet, where the decapsulated second packet includes the second source address and the second destination address;

determining, by the processor, whether the second destination address is the address of the first virtual machine in the first entry; and if the second destination address is the address of the first virtual machine in the first entry, sending, by the processor, the decapsulated second packet by using the network interface and according to the second destination address.

Optionally, the processor may further execute the following operations:

receiving, by the processor by using the network interface, a third packet sent by a fifth NVE device, where the third packet includes the identifier of the first NVE device, the virtual network instance, a third source address, and a third destination address, where the third source address is an address of a fourth virtual machine, the third destination address is the address of the first virtual machine, and the fourth virtual machine is obtained by means of virtualization by a fourth physical server;

decapsulating, by the processor, the third packet to obtain a decapsulated third packet, where the decapsulated third packet includes the third source address and the third destination address; and sending, by the processor, the decapsulated third packet by using the network interface and according to the third destination address.

Figure 7:
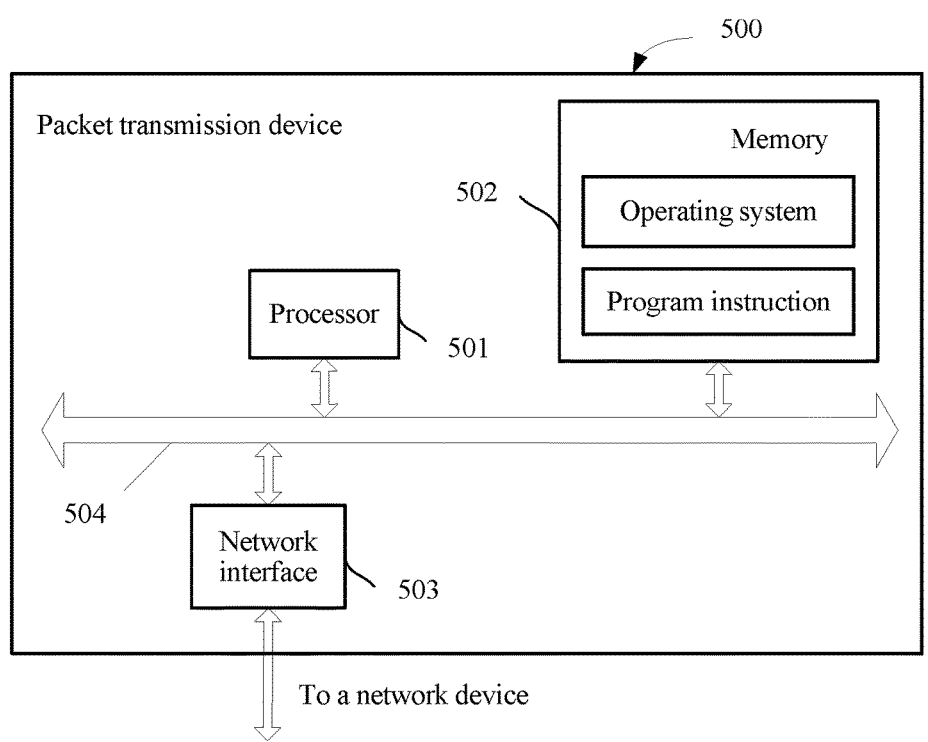
FIG. 7 is a schematic diagram of a packet transmission device according to an embodiment of the present disclosure.

For implementation details of the packet transmission device shown in FIG. 7, refer to the foregoing description of the method embodiment shown in FIG. 3, and details are not described herein.

From the foregoing descriptions of the implementation manners, a person skilled in the art may clearly understand that some or all steps of the methods in the embodiments may be implemented by software in addition to a universal hardware platform. Based on such an understanding, the technical solutions of the present disclosure essentially or the part contributing to the prior art may be implemented in a form of a software product. The software product may be stored in a storage medium, such as a read-only memory (ROM), a RAM, a magnetic disk, or an optical disc, and includes several instructions for instructing a computer device (which may be a personal computer, a server, or a network communications device such as a media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, apparatus and device embodiments are basically similar to a method embodiment, and therefore is described briefly; for related parts, reference may be made to partial descriptions in the method embodiment. The described apparatus and device embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely optional embodiments of the present disclosure, but are not intended to limit the protection scope of the present disclosure. It should be noted that a person of ordinary skill in the art may make certain improvements and polishing without departing from the principle of the present application and the improvements and polishing shall fall within the protection scope of the present application.

What is claimed is:

1. A packet transmission method, wherein the method comprises:
    receiving, by a first Network Virtualization Edge (NVE) device, a first packet, wherein the first packet comprises a first source address and a first destination address, the first source address is an address of a first virtual machine, and the first destination address is an address of a second virtual machine, wherein the first virtual machine is virtualized by a first physical server and the second virtual machine is virtualized by a second physical server;
    obtaining, by the first NVE device, an active-active access configuration information list, wherein the active-active access configuration information list comprises a first entry and a second entry, wherein the first entry comprises an identifier of a first active-active group, a virtual network instance, and an identifier of the first NVE device, and the second entry comprises an identifier of a second active-active group, the virtual network instance, and identifiers of at least two NVE devices that belong to the second active-active group;
    obtaining, by the first NVE device, the virtual network instance according to the first entry and the identifier of the first NVE device;
    searching, by the first NVE device, for at least one active-active group corresponding to the virtual network instance, wherein the at least one active-active group comprises the second active-active group; and selecting a second NVE device from the at least two NVE devices belonging to the second active-active group; and
    encapsulating, by the first NVE device, the first packet by using an identifier of the second NVE device and the virtual network instance, and sending the encapsulated first packet to the second NVE device.

2. The method according to claim 1, wherein the obtaining, by the first NVE device, an active-active access configuration information list comprises: receiving, by the first NVE device, the active-active access configuration information list from a controller.

3. The method according to claim 1, wherein the active-active access configuration information list is described in a Yet Another Next Generation (YANG) language, and the first entry carries the identifier of the first active-active group, the virtual network instance, and the identifier of the first NVE device by using a tree-like structure, wherein the identifier of the first active-active group is a root node, and the identifier of the first NVE device and the virtual network instance are subnodes.

4. The method according to claim 1, wherein the active-active access configuration information list further comprises a third entry, wherein the third entry comprises an identifier of a third active-active group, the virtual network instance, and identifiers of at least two NVE devices that belong to the third active-active group; and the at least one active-active group comprises the second active-active group and the third active-active group; and
    the sending the encapsulated first packet to the second NVE device comprises:
    determining, by the first NVE device, whether the second entry further comprises the address of the second virtual machine; and
    when the second entry further comprises the address of the second virtual machine, searching, by the first NVE device, for the second active-active group corresponding to the address of the second virtual machine, and sending the encapsulated first packet to the second NVE device.

5. The method according to claim 4, wherein the method further comprises:
    when the second entry does not comprise the address of the second virtual machine, sending, by the first NVE device, the encapsulated first packet to the at least two NVE devices belonging to the second active-active group and the at least two NVE devices belonging to the third active-active group.

6. The method according to claim 1, wherein the first entry comprises the identifier of the first active-active group, the virtual network instance, the identifier of the first NVE device, and the address of the first virtual machine, and the method further comprises:
    receiving, by the first NVE device, a second packet sent by a fourth NVE device, wherein the second packet comprises the identifier of the first NVE device, the virtual network instance, a second source address, and a second destination address, wherein the second source address is an address of a third virtual machine, the second destination address is the address of the first virtual machine, and the third virtual machine is virtualized by a third physical server;
    decapsulating, by the first NVE device, the second packet to obtain a decapsulated second packet, wherein the decapsulated second packet comprises the second source address and the second destination address;
    determining, by the first NVE device, whether the second destination address is the address of the first virtual machine in the first entry; and
    when the second destination address is the address of the first virtual machine in the first entry, sending, by the first NVE device, the decapsulated second packet according to the second destination address.

7. A packet transmission apparatus comprising a processor; and a non-transitory computer-readable storage medium including computer-executable instructions executed by the processor to perform operations comprising:
- receiving a first packet, wherein the first packet comprises a first source address and a first destination address, the first source address is an address of a first virtual machine, and the first destination address is an address of a second virtual machine, wherein the first virtual machine is virtualized by a first physical server and the second virtual machine is virtualized by a second physical server;
- obtaining an active-active access configuration information list after the first packet is received, wherein the active-active access configuration information list comprises a first entry and a second entry, wherein the first entry comprises an identifier of a first active-active group, a virtual network instance, and an identifier of a first Network Virtualization Edge (NVE) device, and the second entry comprises an identifier of a second active-active group, the virtual network instance, and identifiers of at least two NVE devices that belong to the second active-active group;
- obtaining, according to the first entry and the identifier of the first NVE device, the virtual network instance from the obtained active-active access configuration information list;
- searching for at least one active-active group corresponding to the virtual network instance in the obtained active-active access configuration information list, wherein the at least one active-active group comprises the second active-active group;
- selecting a second NVE device from the at least two NVE devices belonging to the second active-active group;
- encapsulating the first packet by using an identifier of the second NVE device and the virtual network instance; and
- sending the encapsulated first packet to the second NVE device.

8. The apparatus according to claim 7, wherein:
the obtaining an active-active access configuration information list comprises receiving the active-active access configuration information list from a controller.

9. The apparatus according to claim 7, wherein:
the obtained active-active access configuration information list is described in a Yet Another Next Generation (YANG) language, and the first entry carries the identifier of the first active-active group, the virtual network instance, and the identifier of the first NVE device by using a tree-like structure, wherein the identifier of the first active-active group is a root node, and the identifier of the first NVE device and the virtual network instance are subnodes.

10. The apparatus according to claim 7, wherein the active-active access configuration information list further comprises a third entry, wherein the third entry comprises an identifier of a third active-active group, the virtual network instance, and identifiers of at least two NVE devices that belong to the third active-active group; and the at least one active-active group comprises the second active-active group and the third active-active group; and
the sending the encapsulated first packet comprises determining whether the second entry further comprises the address of the second virtual machine; and when the second entry further comprises the address of the second virtual machine, searching for the second active-active group corresponding to the address of the second virtual machine, and sending the encapsulated first packet to the second NVE device.

11. The apparatus according to claim 10, wherein:
the operations further configured to comprise: when the second entry does not comprise the address of the second virtual machine, sending the encapsulated first packet to the at least two NVE devices belonging to the second active-active group and the at least two NVE devices belonging to the third active-active group.

12. The apparatus according to claim 7, wherein the first entry comprises the identifier of the first active-active group, the virtual network instance, the identifier of the first NVE device, and the address of the first virtual machine, and the operations further comprise:
- receiving a second packet sent by a fourth NVE device, wherein the second packet comprises the identifier of the first NVE device, the virtual network instance, a second source address, and a second destination address, wherein the second source address is an address of a third virtual machine, the second destination address is the address of the first virtual machine, and the third virtual machine is virtualized by a third physical server;
- decapsulating the second packet to obtain a decapsulated second packet, comprising the second source address and the second destination address;
- determining whether the second destination address is the address of the first virtual machine in the first entry; and
- when the determining unit determines that the second destination address is the address of the first virtual machine in the first entry, sending the decapsulated second packet according to the second destination address.

13. The method according to claim 3, wherein the active-active access configuration information list further comprises a third entry, wherein the third entry comprises an identifier of a third active-active group, the virtual network instance, and identifiers of at least two NVE devices that belong to the third active-active group; and the at least one active-active group comprises the second active-active group and the third active-active group; and
the sending the encapsulated first packet to the second NVE device comprises:
- determining, by the first NVE device, whether the second entry further comprises the address of the second virtual machine; and
- when the second entry further comprises the address of the second virtual machine, searching, by the first NVE device, for the second active-active group corresponding to the address of the second virtual machine, and sending the encapsulated first packet to the second NVE device.

14. The method according to claim 3, wherein the first entry comprises the identifier of the first active-active group, the virtual network instance, the identifier of the first NVE device, and the address of the first virtual machine, further comprising:
- receiving, by the first NVE device, a second packet sent by a fourth NVE device, wherein the second packet comprises the identifier of the first NVE device, the virtual network instance, a second source address, and a second destination address, wherein the second source address is an address of a third virtual machine, the second destination address is the address of the first virtual machine, and the third virtual machine is virtualized by a third physical server;

decapsulating, by the first NVE device, the second packet to obtain a decapsulated second packet, wherein the decapsulated second packet comprises the second source address and the second destination address;

determining, by the first NVE device, whether the second destination address is the address of the first virtual machine in the first entry; and when the second destination address is the address of the first virtual machine in the first entry, sending, by the first NVE device, the decapsulated second packet according to the second destination address.

15. The apparatus according to claim 9, wherein the active-active access configuration information list further comprises a third entry, wherein the third entry comprises an identifier of a third active-active group, the virtual network instance, and identifiers of at least two NVE devices that belong to the third active-active group; and the at least one active-active group comprises the second active-active group and the third active-active group; and the sending the encapsulated first packet comprises determining whether the second entry further comprises the address of the second virtual machine; and when the second entry further comprises the address of the second virtual machine, searching for the second active-active group corresponding to the address of the second virtual machine, and sending the encapsulated first packet to the second NVE device.

16. The apparatus according to claim 9, wherein the first entry comprises the identifier of the first active-active group, the virtual network instance, the identifier of the first NVE device, and the address of the first virtual machine, and the operations further comprise:

receiving a second packet sent by a fourth NVE device, wherein the second packet comprises the identifier of the first NVE device, the virtual network instance, a second source address, and a second destination address, wherein the second source address is an address of a third virtual machine, the second destination address is the address of the first virtual machine, and the third virtual machine is virtualized by a third physical server;

decapsulating the second packet to obtain a decapsulated second packet, wherein the decapsulated second packet comprises the second source address and the second destination address;

determining whether the second destination address is the address of the first virtual machine in the first entry; and when the determining unit determines that the second destination address is the address of the first virtual machine in the first entry, sending the decapsulated second packet according to the second destination address.

17. A non-transitory computer-readable storage medium comprising processor-executable instructions that, when executed by at least one hardware processor, cause a packet transmission apparatus to perform operations comprising:

receiving a first packet, wherein the first packet comprises a first source address and a first destination address, the first source address is an address of a first virtual machine, and the first destination address is an address of a second virtual machine, wherein the first virtual machine is virtualized by a first physical server and the second virtual machine is virtualized by a second physical server;

obtaining an active-active access configuration information list after the first packet is received, wherein the active-active access configuration information list comprises a first entry and a second entry, wherein the first entry comprises an identifier of a first active-active group, a virtual network instance, and an identifier of a first Network Virtualization Edge (NVE) device, and the second entry comprises an identifier of a second active-active group, the virtual network instance, and identifiers of at least two NVE devices that belong to the second active-active group;

obtaining, according to the first entry and the identifier of the first NVE device, the virtual network instance from the obtained active-active access configuration information list;

searching for at least one active-active group corresponding to the virtual network instance in the obtained active-active access configuration information list, wherein the at least one active-active group comprises the second active-active group;

selecting a second NVE device from the at least two NVE devices belonging to the second active-active group;

encapsulating the first packet by using an identifier of the second NVE device and the virtual network instance; and sending the first packet encapsulated to the second NVE device.

18. The non-transitory computer-readable medium according to claim 17, wherein the active-active access configuration information list further comprises a third entry, wherein the third entry comprises an identifier of a third active-active group, the virtual network instance, and identifiers of at least two NVE devices that belong to the third active-active group; and the at least one active-active group comprises the second active-active group and the third active-active group; and wherein the operations further comprise:

determining whether the second entry further comprises the address of the second virtual machine; and when the second entry further comprises the address of the second virtual machine, searching for the second active-active group corresponding to the address of the second virtual machine, and send the encapsulated first packet to the second NVE device.

* * * * *